March 26, 1957 G. F. GARDNER 2,786,404
SUBSOILER IMPLEMENT
Filed Oct. 28, 1953 2 Sheets-Sheet 1

INVENTOR.
GUY F. GARDNER
BY
Carlson, Pitzner, Hubbard & Wolfe
ATTORNEYS.

March 26, 1957 G. F. GARDNER 2,786,404
SUBSOILER IMPLEMENT
Filed Oct. 28, 1953 2 Sheets-Sheet 2

INVENTOR.
GUY F. GARDNER
BY
Carlson, Pitzner, Hubbard & Wolfe
ATTORNEYS.

United States Patent Office 2,786,404
Patented Mar. 26, 1957

2,786,404

SUBSOILER IMPLEMENT

Guy F. Gardner, Dearborn, Mich., assignor, by mesne assignments, to Massey-Harris-Ferguson Inc., Racine, Wis., a corporation of Maryland Application October 28, 1953, Serial No. 388,854

5 Claims. (Cl. 97—47.61)

The present invention relates in general to tractor-carried implements and in particular to subsoiler implements adapted to be carried by elevatable rear hitches on tractors.

The general aim of the invention is to provide improvements in the construction of subsoiler implements of the type having a generally vertical knife-edged blade with a shareplate at the lower end thereof, the blade and shareplate being operable at selected depths to break up hardpan and plow sole thereby to improve moisture retention and plant root penetration in farm fields. Such implements have a variety of other uses such as loosening soil packed by truck wheels or opening up swampy land to improve drainage of water from lower levels. Subsoilers have in the past been provided with a blade having more than one knife-edge portion selectively positionable for working engagement with the ground. As one edge portion becomes dulled in use, another can be employed before it is necessary to resharpen any edge.

It is a primary object of the invention to provide a subsoiler of the above-described type in which the blade may be quickly and conveniently repositioned to relocate the working edge portions, with a minimum of disassembly and assembly operations.

It is, more specifically, an object of the invention to provide a subsoiler implement adapted for trailing attachment to a tractor and having a substantially vertical blade or beam with upper and lower sharpened edge portions, interchangeable to the lower ground-engaging position by the simple expedient of removing and replacing two bolts and two linch pins.

A further object of the invention is to provide an implement of the type described adapted for attachment to an elevatable hitch mechanism on the rear of a tractor and having a substantially vertical beam, the lower end of which is engageable with the ground and elevatable through a range greater than that of the hitch mechanism itself to provide increased ground clearance during transport on the tractor.

Figure 1:
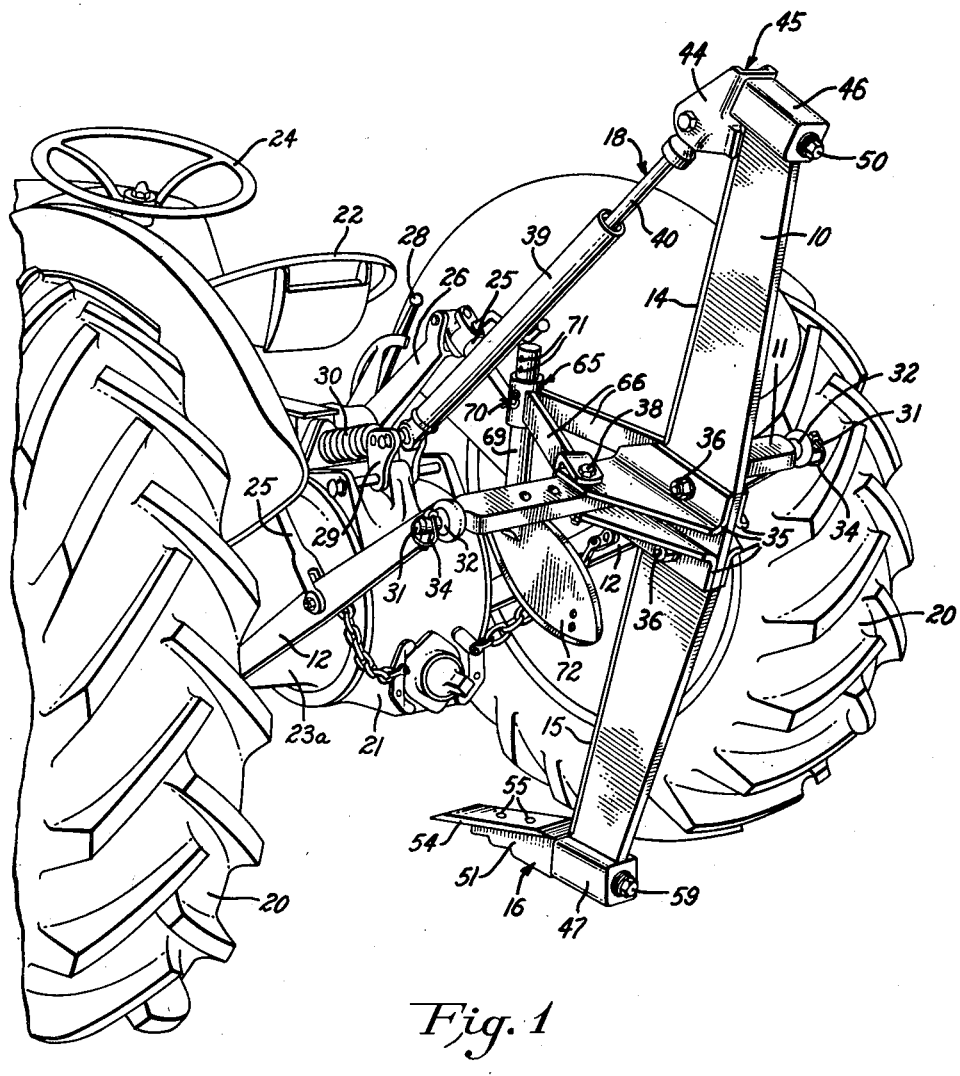
Figure 2:
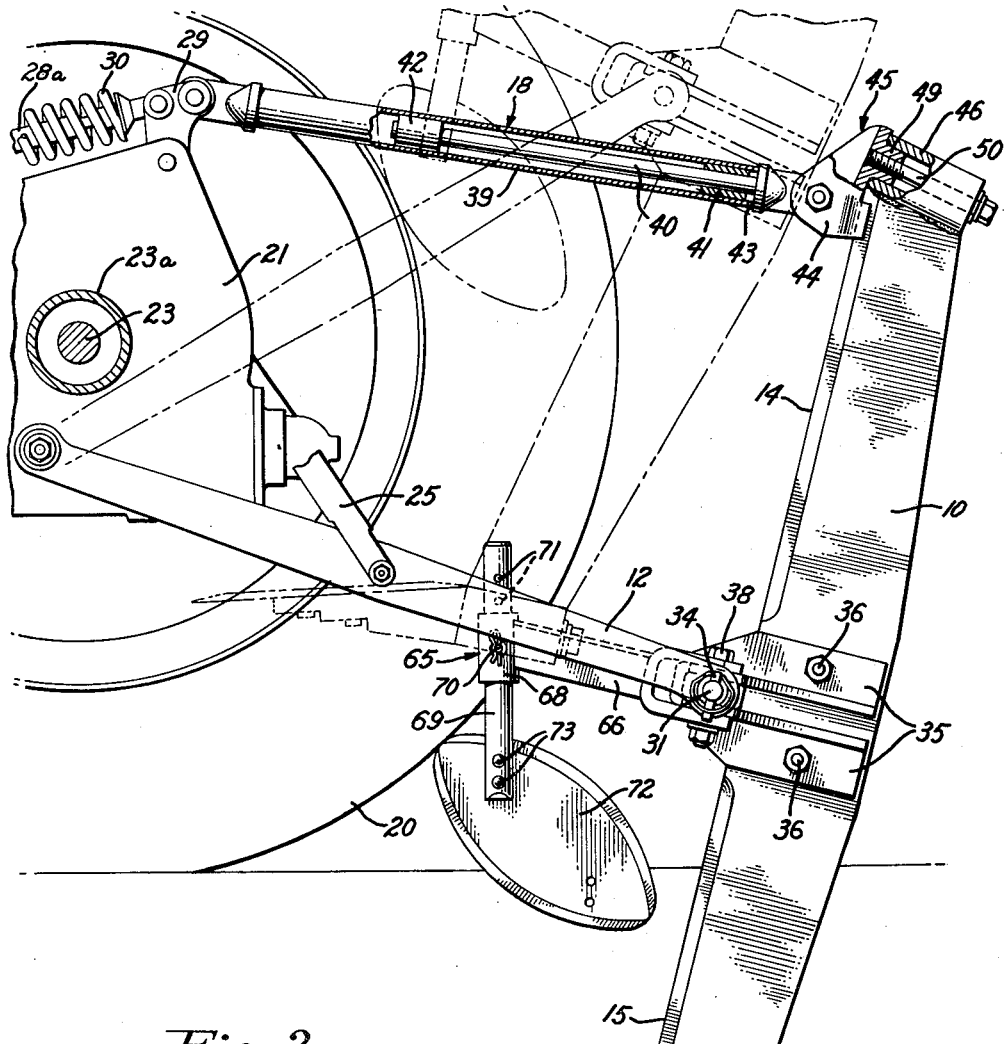

Additional objects and advantages will become apparent as the following description proceeds, taken in connection with the accompanying drawings, in which:

Figure 1 is a rear perspective view of a subsoiler type implement embodying the features of the present invention and illustrated as attached to a rear elevatable hitch on a tractor; and Figure 2 is an enlarged side elevation, partially in section, of the implement in its lowered, working position, and shown by dashed lines in its raised transport position.

Although a particular embodiment of the invention has been shown and described in some detail, and in connection with a certain tractor and hitch mechanism, it is to be understood that there is no intention to limit the invention or to restrict its applicability. On the contrary, it is intended here to cover all alterations, modifications and equivalents falling within the spirit and scope of the invention as defined by the appended claims.

Referring now to the preferred form of the invention here shown, a subsoiler is illustrated as attached to an elevatable hitch mechanism at the rear end of a tractor. The implement includes a vertical elongated cutter beam 10 secured at its mid-portion to a drawbar 11 which is pivotally held between the trailing ends of a lower pair of draft links 12. The beam has sharpened front edge portions 14 and 15 above and below its mid-portion and is adapted at either end for the interchangeable connection of a shareplate assembly 16 and a controlling link assembly 18.

The tractor may take any suitable form. The one illustrated will be recognized by those skilled in the art as the familiar "Ferguson" farm tractor having rear traction wheels 20 driven by axle shafts 23 extending transversely through axle housings 23a from a rear center housing 21 located aft of an operator's seat 22 and steering wheel 24. Further, while the tractor may be equipped with any suitable form of elevatable rear hitch mechanism, there has been illustrated such a power-actuated hitch arrangement of the type fully disclosed in Ferguson Patent 2,118,180. This hitch arrangement includes the pair of rearwardly extending draft links 12 trailingly, universally pivoted to the underside of the rear axle housings 23a at points just forward of the rear axles. The draft links 12 are vertically swingable about their forward pivot connections by means of drop links 25 connected to their middle portions and extending forwardly to lift arms 26 carried by a rock shaft (not shown) mounted on the tractor and operatively connected to a hydraulic ram mechanism (not shown) located within the body of the tractor. The hydraulic ram mechanism and the position of the lift arms 26 are controlled by a valve mechanism actuated by means of a quadrant lever 28 located conveniently with respect to the driver's seat 22. By positioning the quadrant lever 28, the driver can utilize the tractor's power, through the medium of the hydraulic system, to raise and lower the trailing ends of the draft links 12 to any desired position, within predetermined limits. The elevation of the draft links 12 is additionally automatically controllable in response to the position of a shiftable control element or plunger 28a moved by draft forces working through a rocker 29 against a control spring 30. With the rearward drag or draft on a ground working implement transferred to the spring 30 and control element, a selected depth of operation for a uniform soil texture or resistance may be automatically maintained.

The drawbar 11 may be of any suitable construction and is adapted to be pivoted about its longitudinal axis between the trailing ends of the draft links. In this instance, it carries pin-like projections 31 at either end for insertion through apertured balls 32 universally swiveled in the trailing ends of the draft links. Removable linch pins 34 are inserted transversely through the projections to lock the drawbar in place.

The cutter beam 10 is formed of a relatively thin steel plate having the upper and lower sharpened or knife-edged portions 14 and 15 along its leading edge. It is adapted to be carried at its medial portion on the drawbar 11 in cruciform configuration therewith by means of four angle brackets 35 placed in vertically spaced pairs on either side of the beam and secured thereto as by suitable bolts 36. Forwardly extending flanges of the brackets 35 form a horizontal channel in which the drawbar 11 is received and rigidly secured by bolts 38 inserted through matched openings. The drawbar 11 and upright beam 10 are thus rigidly secured in substantially perpendicular relation.

Connection of the cutter beam 10 to the tractor is completed by the controlling link assembly 18 which comprises an extensible top link. The link shown here is telescopically extensible. It includes a hollow sleeve or cylinder 39 slidably receiving an inner plunger member 40. These two members are freely extensible over the major portion of their range of overlap. In fully contracted relation the rear end of the sleeve bottoms on an abutment 43. In fully extended relation an enlarged head 42 on the front end of the inner member engages a suitable stop or collar 41 disposed within and at the rear end of sleeve 39, thus preventing disengagement of the members 39 and 40 through inadvertent overextension of the link.

The forward end of the top link is pivoted to the tractor's control rocker 29, and its aft end is pivoted between spaced flanges 44 of a yoke 45 at the top of the cutter beam 10. Accordingly, when the implement is in use, soil reaction on the cutter beam 10 tends to rock it forwardly about its pivot, seating the abutment 43 solidly against the end of the sleeve 39 so that thrust is transmitted to the rocker 29 for effecting automatic draft control for the beam by the tractor's hydraulic unit. But when the implement is raised for transport, the cutter beam 10 rocks freely backward (i. e., clockwise as here shown) a distance limited by seating of the head 42 against the collar 41.

The cutter beam 10 is adapted at either of its ends to be attached either to the rear end of the top link assembly 18 or to carry the shareplate assembly 16. As shown, the beam is provided at either end with identical socket members 46 and 47 open at the front and apertured at the rear end. Preferably these socket members 46—47 are rectangular in cross section to matingly receive a rectangular, tapped yoke projection 49. They may be mounted by welding directly on the ends of the beam 10. The yoke projection 49 is inserted in the upper socket 46 and secured by a bolt 50 extending through the rear aperture of the socket into threaded engagement with the tapped hole in the projection.

The shareplate assembly 16 includes a removable tip base 51 having an inclined forward surface 52. A shareplate 54 is secured on this surface by plow bolts 55 having their nuts located in stepped protective recesses 56 at the bottom side of the base 51. At the rear of the tip base a projection 58, preferably shaped rectangularly to be received within the lower socket 47, is provided. The base projection 58 is fastened within the beam's lower socket 47 by a securing bolt 59 extending through the socket's rear aperture and a central opening in the projection, the nut 60 for the bolt being protectively located within and accessible through a bottom base recess 61, as shown. The shareplate 54 is sharpened on either end and may have its operating edge reversed simply by removing the plow bolts 55, turning the plate 54, and refastening the bolts.

In order to clear the path of the lower knife-edged portion of the beam, a leading coulter assembly 65 may be secured at the midportion of the beam 10 by the same bolts 38 which fasten the brackets 35 to the drawbar 11. The coulter assembly here shown is particularly suited to be repositioned easily when the cutter beam is reversed end-for-end. This coulter assembly comprises a V-shaped bracket 66 bifurcated and apertured at its spaced extremities to be fastened to the drawbar 11 by the same bolts 38 which lock the latter between the spaced brackets 35. The bracket 66 extends forwardly to carry a substantially vertically disposed collar 68 into which a stem 69 is inserted and locked in adjustable positions by a pin 70 extending through matched holes in the collar and a selected one of several axially spaced adjustment holes 71 in the stem. The stem 69 is axially slotted at its lower end to receive a double-edged reversible coulter blade 72, locked by bolts or rivets 73 inserted through matched openings. By adjusting the stem 69 vertically in the collar, i. e., employing different ones of the adjustment holes 71, the coulter blade 72 may be properly positioned to knife through the surface of the ground in front of the beam edge 15 for any selected depth of operation. And, as the coulter blade 72 becomes dulled on its forward working edge, it may be reversed simply by removing the locking bolts or rivets 73 and re-inserting them through a corresponding pair of openings at the other end of the blade.

In the use of the subsoiler, as the tractor advances the quadrant lever 28 may be positioned to lower the shareplate 54 into engagement with the ground. Rearward and downward draft forces cause the shareplate 54 to knife into the ground to a depth determined by the setting of the quadrant lever 28. The rearward draft force on the lower end of the beam 10 rocks it forward, contracting the extensible link 39 which limits such forward pivoting and applies thrust to the rocker 29. This thrust is transferred to the spring 30, the deflection of which is automatically maintained constant by the hydraulic system which adjusts the depth of the shareplate 54 to maintain the thrust constant for a given setting of the quadrant lever 28. With uniform soil texture, the depth to which the beam works may be selected and maintained constant.

The shareplate 54 and cutter beam 10 thus knife through the soil at a selected depth, breaking up hardpan or plow sole to improve moisture retention. One embodiment of the present invention successfully tested has worked soil to a depth of 21 inches.

During such use, the lower operating edge 15 of the cutter beam may become dulled after a period of time, and, by virtue of the present arrangement, the beam 10 may be reversed end-for-end to bring the upper knife edge portion 14 into the lower operating position. This can be simply effected by removing the top and bottom securing bolts 50 and 59, and withdrawing the yoke and tip base projections 49 and 58 from the sockets 46 and 47. The linch pins 34 for the drawbar 11 are then removed and the drawbar, together with the beam 10 fast on it, is reversed end-for-end between the draft links 12, placing the knife edge 14 originally uppermost in the lower working position. It is necessary only to remove the two securing bolts and two linch pins in order to effect this reversal of the cutting edges. The operation may be completed within an instant with very little effort. When the drawbar 11 has been turned end-for-end in the draft links 12, the yoke projection 49 is inserted in the top socket and secured by the upper bolt 50, and the tip base 51 is replaced on the beam's lower end by the insertion of its projection 58 into the lower socket.

When the cutter beam 10 is so reversed end-for-end, it is but a simple matter to reposition the coulter 65 to depend in working relation forward of the beam's newly positioned working edge. The bracket 66 is simply removed from the drawbar 11 by the removal of the bolts 38, the entire assembly 65 turned over relative to the beam 10, and the bolts 38 replaced to hold the bracket 66 and the blade 72 with the latter depending in leading, working relation to the newly selected lower edge portion of the beam. It will be clear that such relocation of the coulter may be accomplished in an instant and without the need for special tools.

When the subsoiler is not to be operatively engaged with the ground, as when the tractor is driven between different fields, the power actuated hitch mechanism may be employed to raise the draft links 12 and to elevate the shareplate 54 to a transport position. When the draft links 12 are so elevated, however, the beam 10 rocks clockwise under the influence of its own weight which is centered aft of the pivot provided by the drawbar 11. The telescopic link 39 thus extends as shown in Figure 1, with the drawbar 11 pivoting about its longitudinal axis. This results in the lower end of the beam being rocked forward and "tucked under" as viewed in Figure 2 (see dashed outline), considerably raising the shareplate 54 above the position it would occupy if the beam were not so pivoted and greatly increasing the ground clearance obtainable for a given maximum elevation of the draft links.

A considerable ground clearance for implements in stowed positions on tractors is of vital necessity since the tractors may be driven over uneven or rutted ground in transit from one working location to another. An adequate ground clearance is particularly difficult to achieve in the case of implements having vertical ground engaging elements of considerable length, such as the subsoiler beam 10. In providing that the lower half of the beam extend to a relatively great working depth, it is difficult at the same time to achieve such ground clearance when it is elevated to stowed position. The top telescopic link 39 of the present invention, therefore, not only serves to provide part of a three-point reversible mounting for the beam, permitting quick reversal of the sharpened edges as described, and to absorb and transmit the draft force on the lower end of the beam to the automatic control spring and element; it additionally makes possible by its substantial, uninterrupted extension the rocking of the beam 10 to "tuck up" the lower end thereof, thereby providing a stowed ground clearance greater than that available through the action of the draft links 12 alone.

I claim as my invention:

1. A subsoiler adapted for trailing attachment to a tractor having a pair of laterally spaced trailing draft links comprising, in combination, a drawbar, means for reversibly connecting said drawbar between said draft links while permitting the same to rotate about its longitudinal axis, a cutter beam having a sharpened edge on either side of its midportion, means for mounting said cutter beam at its midpoint to be carried substantially vertically by said drawbar, a top link adapted to be connected between the rear of the tractor and the extreme upper end of said beam, a shareplate adapted to be carried at the extreme lower end of said beam, and identical means at either end of said beam for removably fastening said link or said shareplate to said beam, the sharpened edge portions of said beam being interchangeable by reversing said drawbar end-for-end between said draft links.

2. A subsoiler adapted for trailing attachment to a tractor having a pair of laterally spaced and rearwardly trailing draft links comprising, in combination, a drawbar adapted to be carried between the trailing ends of said draft links and rotatable about its longitudinal axis, a cutter beam, means for securing said cutter beam at its midpoint to be carried in substantially vertical orientation by said drawbar, the forward edge of said beam being knife-edged on either side of said securing means, two identical apertured sockets each carried at one extreme end of said beam, a link extending between a point aft on the tractor and the upper end of said beam, means for removably fastening the trailing end of said link to the upper one of said sockets, a shareplate, means for removably fastening said shareplate to the lower one of said sockets, said beam being reversible end-for-end by the expedient of temporarily removing said link and shareplate fastening means, reversing said drawbar end-for-end between said hitch links, and replacing said link and shareplate fastening means to the upper and lower sockets.

3. A subsoiler adapted for reversible trailing attachment to a tractor having an elevatable hitch mechanism including a pair of rearwardly trailing links and a power lift device at its rear end comprising, in combination, a transverse drawbar adapted to be carried by the rearwardly trailing links and rotatable in the rear ends of the latter about its longitudinal axis, a beam having a sharpened forward edge on either side of its midportion, a rigid bracket having means for clamping the same to the center of said beam as well as means for engaging the center of said drawbar for maintaining the beam and drawbar at right angles and rigid with respect to one another, an extensible link adapted to be pivotally connected between the rear end of said tractor and the extreme upper end of said beam and having two relatively telescoping members which bottom together in fully contracted relation when the beam is in a substantially vertical working position and which has means providing substantially free extension thereof incident to raising the links, a shareplate adapted to be carried at the extreme lower end of said beam, and identical sockets at either end of said beam for receiving the shareplate and for connection to the extensible link, said beam being reversible end-for-end by the expedient of (a) temporarily removing said link and shareplate from said sockets, (b) reversing said drawbar end-for-end about a horizontal axis between said hitch links, and (c) connecting said link and shareplate to the upper and lower sockets, respectively.

4. A subsoiler adapted for reversible trailing attachment to a tractor having an elevatable hitch mechanism including a pair of rearwardly trailing links and a power lift device at its rear end comprising, in combination, a transverse drawbar adapted to be carried by the rearwardly trailing links and rotatable in the rear ends of the latter about its longitudinal axis, a beam having flat sides and a sharpened forward edge on either side of its midportion, a bracket rigidly secured to the flat sides of said beam at its center and having a forwardly extending portion rigidly clamped to said drawbar at right angles thereto, the bracket being so constructed that the center of gravity of the combined beam and drawbar is rearwardly of the longitudinal axis of said drawbar so that said beam tends to topple rearwardly when raised clear of the ground by the links, an extensible link adapted to be pivotally connected between the rear end of said tractor and the extreme upper end of said beam having two relatively telescoping members which bottom together in fully contracted relation when the beam is in a substantially vertical working position, the members comprising said telescoping link being constructed and arranged so as to overlap one another over the greater portion of their lengths when in the fully contracted position while being free to extend uninterruptedly over the major portion of their range of overlap so that when the draft links are raised the lower end of said beam swings forwardly and upwardly under the action of the gravity-induced torque about said drawbar into a rearwardly toppled position in which the lower end of the beam is clear of the ground and lies closely adjacent the tractor center housing, a shareplate adapted to be carried at the extreme lower end of said beam, identical means at either end of said beam for receiving the shareplate and for connection to the extensible link, and means enabling quick disengagement between the ends of the drawbar and the respective ends of the draft links for end-for-end reversal of the combined beam and drawbar.

5. A subsoiler adapted for reversible trailing attachment to a tractor having an elevatable hitch mechanism at its rear end including a transverse horizontal drawbar rotatable about its longitudinal axis comprising, in combination, a beam having a sharpened edge on either side of its midportion, bracket means for securing said beam to said drawbar and for maintaining the two members at right angles and rigid with respect to one another, said bracket means comprising four cooperating angle brackets quadrantly placed about the edge to edge intersection of said beam and drawbar together with the threaded fastening elements extending through the angle brackets and the beam and through the angle brackets and the drawbar for clamping the members into a rigid unit, an extensible link adapted to be pivotally connected between the rear end of said tractor and the extreme upper end of said beam and having two relatively telescoping members, said telescoping members being arranged to bottom together in fully contracted relation when the beam is in a substantially vertical position while permitting unobstructed relative extension over the major portion of their lengths to enable the beam to topple rearwardly under transport conditions bringing the lower end thereof adjacent the tractor center housing, said beam being secured to the angle brackets at the geometric center thereof for facilitating end-for-end reversal of said beam, a shareplate adapted to be carried at the extreme lower end of said beam, and identical sockets at either end of said beam for receiving the shareplate and for connection to the extensible link, thereby permitting said subsoiler to be removed from the tractor and remounted with the beam in an end-for-end reversed position.

References Cited in the file of this patent

UNITED STATES PATENTS

| | | |
|---|---|---|
| 2,273,875 | Livesey et al. | Feb. 24, 1942 |
| 2,473,357 | Blunier | June 14, 1949 |
| 2,533,435 | Cook et al. | Dec. 12, 1950 |
| 2,552,292 | Metz et al. | May 8, 1951 |
| 2,573,221 | Romig | Oct. 30, 1951 |
| 2,673,510 | Bailey | Mar. 30, 1954 |

FOREIGN PATENTS

| | | |
|---|---|---|
| 337,716 | France | Feb. 27, 1904 |
| 641,744 | Great Britain | Aug. 16, 1950 |